United States Patent

Kobayashi et al.

[11] Patent Number: 5,879,798
[45] Date of Patent: Mar. 9, 1999

[54] HEAT RESISTANT, HIGH SATURATION MAGNETIC FLUX DENSITY FILM

[75] Inventors: Toshio Kobayashi, Tokyo; Ryoichi Nakatani, Akigawa; Hitoshi Nakamura, Hachioji; Noriyuki Kumasaka, Ome, all of Japan

[73] Assignee: Hitachi, Ltd., Tokyo, Japan

[21] Appl. No.: 534,872

[22] Filed: Jun. 8, 1990

[30] Foreign Application Priority Data

Jun. 14, 1989 [JP] Japan ................................ 1-149626

[51] Int. Cl.⁶ ........................................................ G11B 5/66
[52] U.S. Cl. ........................... 428/332; 428/336; 428/403; 428/692; 428/693; 428/694 T; 428/698; 428/704; 428/900; 428/920
[58] Field of Search ...................... 428/692, 693, 428/704, 694 T, 698, 900, 920, 403, 332, 336

[56] References Cited

U.S. PATENT DOCUMENTS 4,920,013  4/1990  Kobayashi et al. .................... 428/694

FOREIGN PATENT DOCUMENTS 210607  9/1987  Japan .

OTHER PUBLICATIONS

Japanese Patent Unexamined Publication No. 62–210607 Sep. 16, 1987.
"MR 88–55" published by Electronic Communication Information Society, on Mar. 22, 1989, pp. 9–16.

*Primary Examiner*—Leszek Kiliman
*Attorney, Agent, or Firm*—Antonelli, Terry, Stout & Kruas, LLP

[57] ABSTRACT

A heat resistant, high saturation magnetic flux density film, comprising, a plurality of crystal grains of ferromagnetic metal, and carbide or boride positioned around each of plurality of crystal grains.

20 Claims, 4 Drawing Sheets

F I G. 3
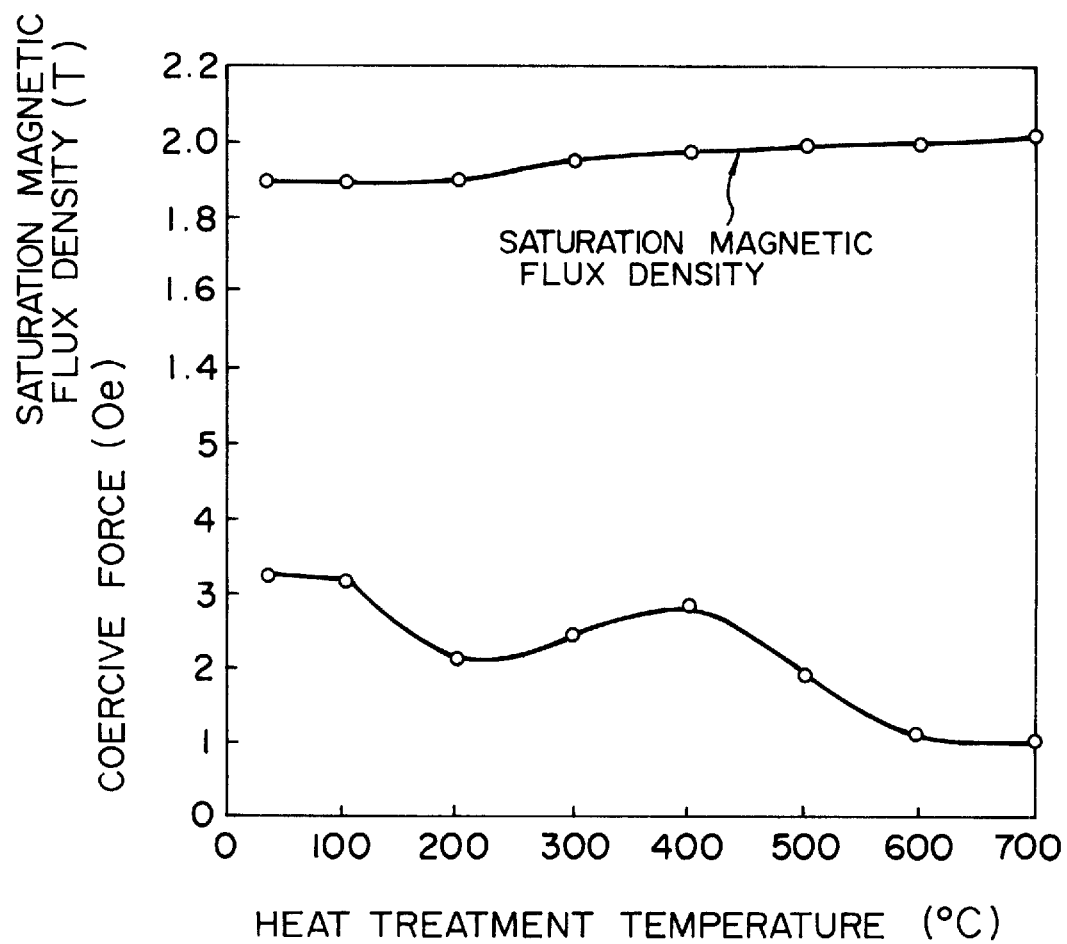

HEAT RESISTANT, HIGH SATURATION MAGNETIC FLUX DENSITY FILM

BACKGROUND OF THE INVENTION

The present invention relates to a magnetic pole material for use in magnetic disks, VTRs or the like, and, more particularly, to a heat resistant, high saturation magnetic flux density film having high saturation magnetic flux density, high permeability, and excellent heat and corrosion resistance, and to a magnetic head using the same.

Recently, magnetic recording technology has been highly developed, and the recording density has been raised significantly. In order to raise the recording density, it is necessary to use a recording medium having high coercive force. In order to magnetize a recording medium having high coercive force, a magnetic pole material having high saturation magnetic flux density must be employed. Therefore, a Ni—Fe alloy (permalloy) film or a Co amorphous alloy film has been employed as the magnetic pole material instead of conventional ferrite etc. Furthermore, it is necessary for the magnetic pole material to have excellent permeability for the purpose of improving the recording/reproducing efficiency as well as having the above-described high saturation magnetic flux density. Furthermore, it is necessary for the magnetic pole material to have excellent heat resistance so as to be capable of withstanding a heating process effected for forming the magnetic head, for the purpose of maintaining the excellent permeability.

In Japanese Patent Laid-Open No. 62-210607 and "MR 88-55" published by Electronic Communication Information Society, on Mar. 22, 1989, materials prepared by simultaneously adding: one kind selected from the group consisting of Nb, Zr, Ti, Ta, Hf, Cr, W and Mo; and nitrogen to a metal selected from a group consisting of Fe, Co, Ni and Mn has been disclosed. The above-described material can be prepared by a sputtering method in which the sputtering of a metal target having a predetermined composition is effected in a mixture gas of argon and nitrogen. According to the above-described disclosure, a film having a saturation magnetic flux density of 1.5 T and coercive force of 1 Oe or less can be obtained by alternately laminating nitride layers and non-nitride layers while modulating the nitrogen density in the sputtering gas. The coercive force of the above-described film can be maintained to a low level in a temperature range up to 600° C. Therefore, it has heat resistance of 600° C.

The inventors of the present invention examined supplementarily the above-described disclosure by sputtering an Fe—Nb material in a mixed gas of argon and nitrogen. As disclosed above, it was confirmed that the above-described material had low coercive force of 1 Oe or less at 400° to 600° C. However, the inventors have found such a problem in the above-described experiment that a part of the body-centered cubic crystal structure of Fe is transformed into a face centered cubic crystal structure when the temperature exceeds 600° C. with the result that the saturation magnetic flux density of the obtained film is lowered due to the transformation. Furthermore, in this examination, the nitrogen gas must be intermittently introduced during sputtering. However, the intermittent introduction of the nitrogen gas while maintaining constant sputtering gas pressure needed complicated gas control.

SUMMARY OF THE INVENTION

An object of the present invention is to provide a novel high saturated magnetic flux density soft magnetic film and a magnetic head having this film capable of overcoming the above-described problems and maintaining the high saturated magnetic flux density and the soft magnetic characteristics up to a high temperature.

In order to achieve the above-described object, according to the present invention, there is provided a heat resistant, high saturation magnetic flux density film comprising a plurality of crystal grains of ferromagnetic metal, and carbide or boride positioned around each of said plurality of crystal grains.

It is preferable that the thickness of the heat resistant high saturation magnetic flux density film is in a range of 20 nm to 50 μm, that the size of each of the crystal grains of the ferromagnetic metal is in a range between 50 Å and 500 Å, and that the thickness of carbide or boride is in a range between 1 Å and 100 Å, and the volume ratio of carbide to the ferromagnetic metal crystal is in a range of 5 to 30 vol %.

It is preferable that the ferromagnetic metal includes Fe, Co or Ni as its main components.

It is preferable that carbide is at least one kind selected from a group consisting of Hf—C, Nb—C, Ta—C, Ti—C, Zr—C, V—C, W—C, Mo—C, B—C and Si—C.

It is preferable that boride is at least one kind selected from a group consisting of Hf—B, Nb—B, Ta—B, Ti—B, Zr—B, V—B, Ba—B, Ca—B, Sr—B, La—B, Sm—B and Y—B.

The inventors found after sincere study that the saturation magnetic flux density and the soft magnetic characteristics can be maintained up to a high temperature by mixing a high melting point material such as carbide or boride into the ferromagnetic metal film instead of the introduction of nitrogen into the magnetic film. The carbide or boride is a material containing at least one kind selected from a group consisting of Hf—C, Nb—C Ta—C, Ti—C, Zr—C, V—C, W—C, Mo—C and Si—C, B—C, Hf—B, Nb—B, Ta—B, Ti—B, Zr—B, V—B, Ba—B, Ca—B, Sr—B, La—B, Sm—B and Y—B. In addition to the substance, additives may be added in order to improve the soft magnetic characteristics and corrosion resistance.

The present invention is not limited to the method of mixing the carbide or boride. If carbide or boride is not present at the time of forming the magnetic film, it may be generated by the heat treatment or the like after the film had been formed. It may be previously mixed in the form of carbide or boride at the time of forming the magnetic film. As a mixing method, there may be employed the lamination of the magnetic layer and carbide or boride, the lamination of the magnetic layer and elements forming carbide or boride, or the simultaneous lamination of the magnetic layer and the elements forming carbide or boride.

When the heat resistant, high saturation magnetic flux density film is used in the magnetic head of a magnetic recording device, a magnetic recording device exhibiting excellent recording/reproducing characteristics can be obtained. In particular, a further excellent effect can be obtained when the saturation flux density film according to the present invention is applied to a metal-in-gap type heads that are manufactured by a method including a glass bonding process.

As described above, a high saturation magnetic flux density and soft magnetic characteristics can be maintained up to a high temperature by mixing a high melting point material such as carbide or boride into the ferromagnetic metal film. The mechanism has not been clarified yet. However, the inventors found a fact, after the study, that the ferromagnetic film in which the above-described high melting point material has been mixed can be prevented from becoming coarse in crystal grain size even if it is heated up to 700° C. Therefore, it has been confirmed that the high melting point material can restrict the diffusion of the constituents of the ferromagnetic film so that the undesirable growth of the crystal grains due to heating can be prevented. As a result of an analysis of the film heated up to 700° C. conducted by use of a high resolution EPMA (Electron Probe Micro Analysis) method, a phase of carbide or boride is observed around the crystal grains forming the ferromagnetic film. Thus, it can be considered that the presence of the above-described phase can restrict the coarsening of the crystal grains forming the ferromagnetic film. The soft magnetic characteristics of the ferromagnetic materials, with the exception of materials having a magnet crystalline anisotropy constant which is approximately zero, relate to the size of each of the crystal grains forming the ferromagnetic material. Therefore, it has been known that the soft magnetic characteristics are degraded as the size of each of the crystal grains becomes coarse. Therefore, it can be considered that the deterioration in the soft magnetic characteristics was prevented in the present invention because the size of each of the crystal grins is made to be fine up to high temperature. However, carbide or boride was not always observed in the same film by the X-ray analysis. Thus, it is considered that the above-described materials were extremely small in amount or in the form of amorphous state.

Since the high melting point material is carbide or boride, the soft magnetic characteristics were not critically deteriorated even if, for example, C or B exists in a solid-solution state in Fe. Furthermore, the saturation magnetic flux density of the ferromagnetic film according to the present invention was inversely proportional to the quantity of carbide or boride to be added. It can be considered that it is an effect of a simple dilution due to the addition of non-magnetic material.

Other and further objects, features and advantages of the invention will be appear more fully from the following description and drawings.

BRIEF DESCRIPTION OF THE DRAWINGS

FIG. 3 is a graph which illustrates a change in the magnetic characteristics of an Fe ferromagnetic film according to a third embodiment of the present invention, the change being due to heat treatment;

DESCRIPTION OF THE PREFERRED EMBODIMENTS

Preferred embodiments of the present invention will now be described with reference to the drawings.

Embodiment 1

Figure 5:
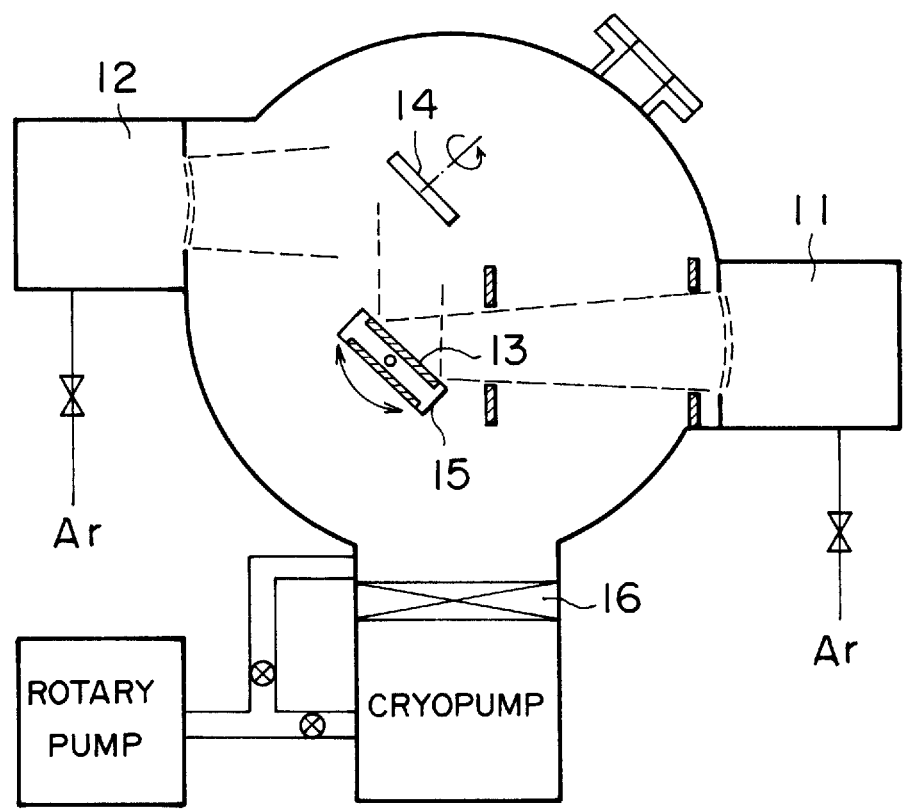
FIG. 5 is a schematic cross sectional view which illustrates an ion beam sputtering apparatus used in the embodiments of the present invention.

A ferromagnetic film the main constituent of which were Fe or Co or Ni was formed on a crystalized glass substrate by using an ion beam sputtering apparatus shown in FIG. 5. The ion beam sputtering apparatus used in this example comprises two ion guns 11 and 12, one of the ion guns 11 being capable of sputtering a target 13 so as to coat sputtered particles onto a substrate 14. Another ion gun 12 is able to clean up the substrate. A target holder 15 of the ion beam sputtering apparatus is arranged to be a rotationary and horizontally movable type and capable of holding four types of targets so that an optional target can be selected to sputter it. Reference numeral 16 represents a main valve. Therefore, a desired laminated film, constituted by the target materials thus sputtered, can be formed. A laminated film comprising ferromagnetic layers of Fe or Co or Ni included as a main constituent and carbide or a boride layers was formed. The sputtering conditions were as follows:

| | |
|---|---|
| Ion gas | Ar |
| Pressure of Ar gas in the apparatus | $2.5 \times 10^{-2}$ Pa |
| Accelerating Voltage of ion gun for evaporating | 1200 V |
| Ion current of ion gun for evaporating | 120 mA |
| Distance between target and substrate | 127 mm |
| Temperature of substrate | 50 to 100° C. |

Figure 1:
FIG. 1 is a cross sectional view which illustrates the cross sectional structure of a first embodiment of a ferromagnetic laminated film according to the present invention.

The cross section of the thus formed laminated film is shown in FIG. 1. According to this example, "Fopoceram" (crystalized glass) substrate manufactured by Coning Company was employed as the substrate 1. Then, there was formed a laminated film constituted by 17 nm (which is the same as the size of a crystal grain in the direction of the thickness of the film) thick ferromagnetic metal layers 2 and 3 nm thick carbide layers or boride layers 3. Since the overall thickness of the laminated film was made to be 1 $\mu$m, 50 ferromagnetic metal layers were formed and 49 carbide layers or boride layers were formed.

The obtained laminated film was subjected to a heat treatment in the temperature range from 100° C. to 700° C. in an Ar gas. There were effected the evaluation of soft magnetic characteristics, the evaluation of crystallographic property by use of X-ray diffraction, and the confirmation of carbide layers or boride layers by use of analysis with respect to each of the laminated films. The results thereof are shown in Table 1.

TABLE 1

| No. | Ferromagnetic Metal Layer | Carbide or Boride | Coercive Force (Oe) | Size of Crystal Grain of Ferromagnetic Metal Layer (Å) | Heat Resistance (°C.) |
|---|---|---|---|---|---|
| Present Invention | | | | | |
| 1 | Fe | HfC | 0.8 | 180 | 700 |
| 2 | Fe | NbC | 0.9 | 190 | 700 |
| 3 | Fe | TaC | 0.9 | 200 | 700 |
| 4 | Fe | TiC | 0.8 | 190 | 700 |
| 5 | Fe | ZrC | 0.8 | 200 | 700 |
| 6 | Fe | VC | 0.9 | 210 | 700 |
| 7 | Fe | WC | 0.8 | 180 | 700 |
| 8 | Fe | SiC | 0.6 | 160 | 700 |
| 9 | Fe | $B_4C$ | 0.7 | 180 | 700 |
| 10 | Fe | $HfB_2$ | 0.9 | 200 | 700 |
| 11 | Fe | $TiB_2$ | 0.8 | 190 | 700 |

TABLE 1-continued

| No. | Ferro-magnetic Metal Layer | Carbide or Boride | Coercive Force (Oe) | Size of Crystal Grain of Ferromagnetic Metal Layer (Å) | Heat Resistance (°C.) |
|---|---|---|---|---|---|
| 12 | Fe | $WB_2$ | 1.2 | 220 | 700 |
| 13 | Co | TiC | 1.5 | 240 | 700 |
| 14 | Co | MoC | 1.3 | 240 | 700 |
| 15 | Co | TaB | 1.6 | 270 | 700 |
| 16 | Co | SiC | 1.4 | 250 | 700 |
| 17 | Ni | TaC | 0.9 | 200 | 700 |
| 18 | Ni | TiB | 1.2 | 220 | 700 |
| 19 | $Fe_{70}Co_{30}$ | HfC | 0.8 | 170 | 700 |
| 20 | $Fe_{90}Ni_{10}$ | TaC | 0.7 | 180 | 700 |
| Comparative Example | | | | | |
| 21 | Fe | — | more than 20 | more than 700 | 400 |

In Table 1, "ferromagnetic metal layers", "carbide" and "boride" are the components of the targets used at the time of forming the films. The values of the coercive force and the size of the crystal grains forming the ferromagnetic metal layers were the values obtained after subjected to the heat treatment at 700° C. for one hour. The size of the crystal grains were obtained from the full width at half maximum of the diffraction intensity measured by the X-ray diffraction method. As a result, a ferromagnetic film exhibiting excellent soft magnetic characteristics of coercive force of 1.5 Oe or less was obtained even at a high temperature of 700° C. by alternately laminating both of the ferromagnetic metal layers, the main constituent of which are Fe or Co or Ni, and a high melting point material such as carbide or boride. It was confirmed that the size of the crystal grains was 250 Å or less. Since the size of the crystal grains before the heat treatment was 150 Å to 200 Å, it was confirmed that the size of the crystal grain was not considerably changed by the heat treatment. As comparative materials, 1 μm thick films each of which consisted of only the ferromagnetic metal layer were formed and subjected to the heat treatment. As a result, the crystal grains of the comparative material were undesirably coarsened and their coercive force became more than 5 Oe. A comparative material among the above-described comparative materials is shown in Table 1 which comparative material includes Fe as the main constituent thereof. Therefore, it is apparent that heat resistance can be improved by introducing a high melting point material such as carbide or boride into the ferromagnetic metal film.

The cross sectional structure of the laminated films, which had been subjected to the 700° C. heat treatment, was observed with an electron microscope. It was confirmed that the lamination structure was maintained even after the 700° C. heat treatment. Therefore, it is apparent that the high melting point material such as carbide or boride effectively restricted the coarsening of the crystal grains. Incidentally, the inventors manufactured another comparative laminated film which was formed by alternately laminating ferromagnetic metal layers and different metal layers used instead of carbide or boride, the thus manufactured comparative laminated films being then subjected to the 700° C. heat treatment. Then, the cross sectional structures of the comparative laminated films were observed with the electron microscope. As a result, the metal layers different from the kind of the ferromagnetic metal layers were completely diffused and no metal layers were observed. Furthermore, the crystal grains were coarsened, and some of the grains were coarsened in size extremely to thereby become single crystal extending from the surface of the film to the boundary defined by a substrate.

As a result of the evaluation of the magnetic film according to the present invention by means of the X-ray analysis, the crystal structure of the film subjected to the 700° C. heat treatment was a body-centered cubic structure in the case where the main constituent of the film was Fe. On the other hand, the crystal structure in the case where the main constituent was Co was a hexagonal closed packing structure. In the case where the main constituent was Ni, it was a face centered cubic structure. Each of the above-described structures was a single phase, without having other structures. Therefore, in the present invention, even in the case where the main constituent was Fe, there occurred no such conventional phenomenon that the saturation magnetic flux density was lowered when the temperature exceeds 600° C. as in prior art films, and a high saturation magnetic flux density of 1.7 T or more was obtained.

Example 2

Ferromagnetic metal films were produced by use of the same conditions as Example 1 with the exception that a ferromagnetic layer containing carbon or boron was used instead of the ferromagnetic layer of Example 1 and that metals shown in Table 2 were used instead of the carbide or boride of Example 1.

TABLE 2

| No. | Ferro-magnetic Layer | Metal | Coercive Force (Oe) | Size of Crystal Size of Ferromagnetic Layer (Å) | Heat Resistance (°C.) |
|---|---|---|---|---|---|
| Present Invention | | | | | |
| 1 | $Fe_{95}C_5$ | Hf | 0.7 | 160 | 700 |
| 2 | $Fe_{95}C_{10}$ | Nb | 0.8 | 180 | 700 |
| 3 | $Fe_{95}C_5$ | Ta | 0.7 | 190 | 700 |
| 4 | $Fe_{90}C_5$ | Ti | 0.8 | 190 | 700 |
| 5 | $Fe_{95}C_{15}$ | Zr | 0.9 | 190 | 700 |
| 6 | $Fe_{95}C_5$ | V | 0.9 | 200 | 700 |
| 7 | $Fe_{95}C_5$ | W | 0.9 | 180 | 700 |
| 8 | $Fe_{95}C_5$ | Mo | 0.8 | 190 | 700 |
| 9 | $Fe_{92}C_8$ | Si | 0.7 | 180 | 700 |
| 10 | $Fe_{95}C_5$ | B | 0.8 | 180 | 700 |
| 11 | $Fe_{95}B_5$ | Ti | 0.9 | 190 | 700 |
| 12 | $Fe_{88}B_{12}$ | W | 1.1 | 200 | 700 |
| 13 | $Co_{95}C_5$ | Ti | 0.9 | 190 | 700 |
| 14 | $Co_{95}C_5$ | Mo | 0.8 | 180 | 700 |
| 15 | $Co_{90}C_{10}$ | Ta | 0.8 | 170 | 700 |
| 16 | $Co_{95}C_5$ | Nb | 0.7 | 170 | 700 |
| 17 | $Co_{95}C_5$ | Si | 0.7 | 180 | 700 |
| 18 | $Co_{95}B_5$ | Ti | 1.1 | 200 | 700 |
| 19 | $Ni_{95}B_5$ | Hf | 0.8 | 170 | 700 |
| 20 | $Fe_{70}Co_{25}C_5$ | Ta | 0.9 | 180 | 700 |
| Comparative Example | | | | | |
| 21 | $Fe_{95}C_5$ | — | more than 20 | more than 700 | 400 |

Figure 2:
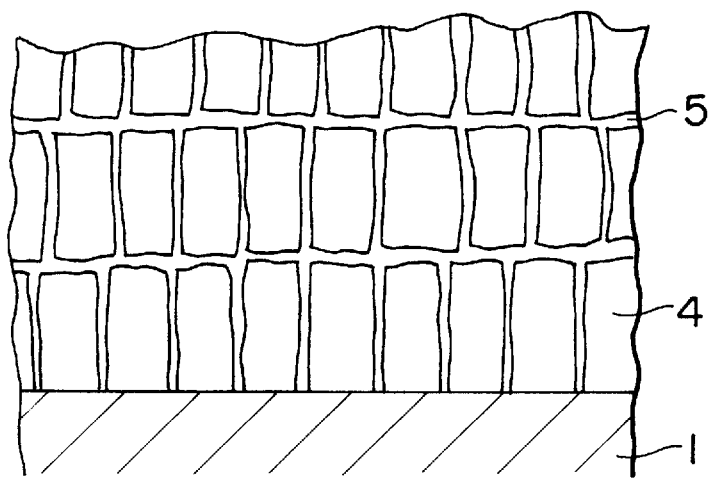
FIG. 2 is a schematic view which illustrates the structure of a second embodiment of the ferromagnetic laminated film according to the present invention after subjected to a heat treatment.

The obtained results are shown in Table 2, wherein the components of the ferromagnetic layers and the metals were those of the targets at the time of forming the layers. The values of the coercive force and the size of the crystal grains forming the ferromagnetic metal layers were the values obtained after subjected to the heat treatment at 700° C. for one hour. The size of the crystal grains was obtained from the full width at half maximum of the diffraction intensity measured by the X-ray diffraction method similarly to Example 1. As a result, a ferromagnetic film exhibiting excellent soft magnetic characteristics of coercive force of 1.1 Oe or less was obtained by laminating both of the ferromagnetic metal layers, the main constituent of which is Fe, Co or Ni, and carbide or boride even in a case where a heat treatment temperature of 700° C. was adopted. It was confirmed that the size of the crystal grains was 200 Å or less in this case. Since the size of the crystal grains before the heat treatment was 150 Å or less, it was confirmed that the size of the crystal grain was not considerably changed by the heat treatment. However, the coercive force was temporarily increased in the temperature range from 300° C. to 450° C. and then it was reduced when the temperature was further raised. Thus, the change in the coercive force due to the heat treatment was different from the case of Example 1 in which the ferromagnetic metal layer was laminated via carbide or boride. The change in the saturation magnetic flux density due to the heat treatment was resulted similarly to Example 1 where there was no significant change. In particular, the saturation magnetic flux density was not reduced even when the heat treatment temperature of 600° C. or higher was used. The cross sectional structure of the laminated films, which had been subjected to the 700° C. heat treatment, were observed with an electron microscope. It was confirmed that the lamination structure was maintained even after the 700° C. heat treatment. Therefore, it is apparent that the laminated structure effectively restricted the coarsening of the crystal grains in the ferromagnetic metal film. The inventors analyzed the above-described ferromagnetic metal laminated films by a high resolution EPMA method. As a result, in the position of the metal layer disposed between adjacent two ferromagnetic layers there was gathered carbon or boron added to the ferromagnetic layer film, that is, it can be considered that carbide or boride were formed therein. Furthermore, it was confirmed that a portion of the interposed metal was diffused and, distributed so as to surround, as shown in FIG. 2, each of the crystal grains 4 which form the ferromagnetic film. Since carbon or boron was present in the surrounding portion 5, it can be considered that they are present in the form of carbide or boride.

The thus formed films were analyzed by XPS (Xray Photoelectron Spectroscopy). As a result, it was confirmed that the carbon or boron and the metal disposed between two adjacent ferromagnetic layers were in a bonded state (that is, in the form of carbide or boride). Therefore, it is apparent that heat resistance can be improved by causing the high melting point material such as carbide or boride to be positioned around the crystal grains which form the ferromagnetic metal film. For comparison, a comparative material consisting of only ferromagnetic material ($Fe_{95}C_5$) was manufactured by the same method as the comparative material No. 21, the characteristics of which are shown in Table 2. The comparative material No. 21 showed coercive force of 20 Oe more and poor heat resistance of 400° C.

Example 3

Ferromagnetic films were formed by simultaneously sputtering both of the ferromagnetic metal, the main constituent of which was Fe or Co or Ni, and carbide or boride shown in Table 1 or by simultaneously sputtering each of the elements. A target material was formed by mixing the ferromagnetic metal and carbide or boride shown in Table 1 in the same ratio as the thickness ratio according to Example 1. The above-described ferromagnetic film was formed on the crystalized glass substrate by the same ion beam sputtering apparatus and conditions as those of Example 1. Furthermore, films formed by adding other elements (for example, 1 to 10 at % Rh, 1 to 10 at % Ru or the like) in order to improve corrosion resistance were prepared in addition to those shown in Table 1.

The obtained laminated films were heat-treated, similarly to Example 1, in the temperature range from 100° C. to 700° C. in an Ar gas for one hour. Regarding the resultant films, there were effected the confirmation of carbide layer or the boride layer, the evaluation of their soft magnetic characteristics, and crystallographical evaluation thereof by means of X-ray analysis. FIG. 3 shows the magnetic characteristics of a film, the main constituent of which was Fe and 4 at % Ta while 5 at % C and 2 at % Ru were added. The soft magnetic characteristics of the above-described ferromagnetic films, the main constituent each of which was Fe or Co or Ni, were not sufficiently satisfactory immediately after the film had been formed. However, the soft magnetic characteristics were improved considerably by the heat treatment at 200° C., and they were deteriorated temporarily at 300° C. to 400° C. However, the soft magnetic characteristics were again improved, resulting in coercive force of 1.2 Oe or less when the temperature exceeded 600° C. It can be considered that the stress in the film was relaxed by the heat treatment and the crystal grains were not coarsened at the high temperature because of the generation of carbide or boride. It was confirmed that the size of the crystal grain was 250 Å or less.

The inventors analyzed the above-described ferromagnetic films by the high resolution EPMA and the XPS methods. As a result, it was confirmed that carbide or boride was present in such a manner that they surrounded the crystal grains forming the ferromagnetic film similarly to Example 2. Therefore, it is apparent that heat resistance can be improved by causing a high melting point material such as carbide or boride to be disposed around the crystal grains forming the ferromagnetic metal film.

The thus obtained crystal structures were examined by the X-ray analysis, resulting that the body centered cubic structure was stable in the temperature range up to 700° C. in the case where the main constituent was Fe. Furthermore, the saturation magnetic flux density was not reduced by the heat treatment.

Example 4

Figure 4A:
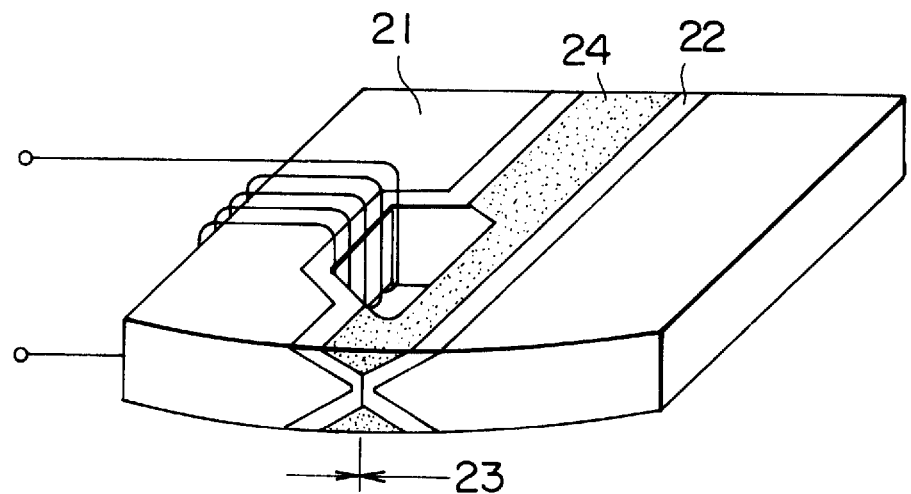
FIG. 4A is a perspective view which illustrates a magnetic head according to the present invention.
Figure 4B:
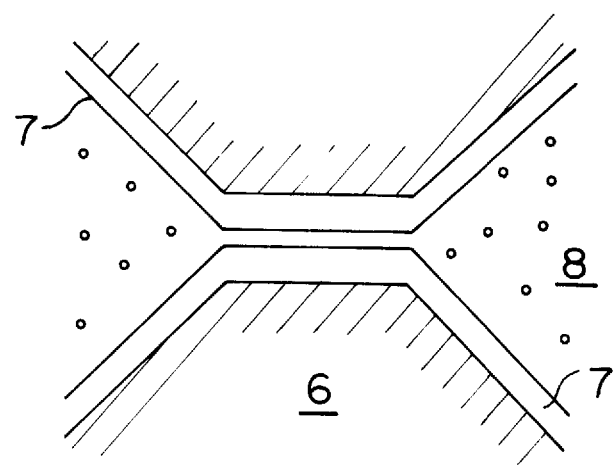
FIG. 4B is a top view which illustrates a portion in the vicinity of a metal-in-gap portion of the magnetic head.

As shown in FIGS. 4A and 4B, magnetic poles of a metal-in-gap type head were manufactured by using the ferromagnetic films obtained from Examples 1 to 3 and were subjected to the evaluations of the head for a high density magnetic recording device. The substrate 21 was made of Mn—Zn ferrite ($32MnO.14ZnO.54Fe_2O_3$), the thickness of the magnetic film 22 being 5 μm, and the gap 23 was 0.3 μm. The temperature at which the glass 23 used for forming the head was bonded was 620° C. The medium used in the evaluations had coercive force of 1500 Oe. As a result, the recording characteristics of the head, the magnetic pole of which was made of Fe ferromagnetic film, were improved by about 4.6 dB in comparison to a conventional Sendust head, while the reproduction output was increased by about 3 dB in the head of the invention. In the case where the Fe ferromagnetic film was used to form the magnetic pole of the head of the invention, a recording density of 100 kBPI or more was obtained. The reason for this resides in that the Fe ferromagnetic film has the higher saturation magnetic flux density in comparison with that of other materials.

Although the magnetic films were formed by the ion beam sputtering method in the case of the examples, the inventors carried out the evaluation by employing the RF sputtering method. As a result, there was obtained the magnetic film having substantially the same magnetic characteristics and the heat resistance as in the ion beam sputtering method. Therefore, the present invention can be effective regardless of the method of forming the film.

As described above, according to the present invention, the heat resistant high saturation magnetic flux density film shows excellent soft magnetic characteristics if heat treatment temperature is up to 700° C., and its saturation magnetic flux density is not reduced if the temperature is not more than 700° C. Therefore, when the heat resistant high saturation magnetic flux density film is employed in the magnetic head of a magnetic recording device, in particular when employed in the metal-in-gap type magnetic head, glass bonding can be conducted at a high temperature exceeding 500° C., so that a glass layer having satisfactory strength can be formed.

Furthermore, a film having further improved soft magnetic characteristics can be obtained by laminating the heat resistant high saturation magnetic flux density film of the present invention via other materials. Consequently, the recording/reproducing characteristics of the magnetic head can be improved and the recording density of the same can be raised.

What is claimed is:

1. A heat resistant, high saturation magnetic flux density film, comprising a single layer containing a plurality of crystal grains of ferromagnetic metal, and carbide positioned around each of said plurality of crystal grains.

2. A heat resistant, high saturation magnetic flux density film, comprising a single layer containing a plurality of crystal grains of ferromagnetic metal, and boride positioned around each of said plurality of crystal grains.

3. A heat resistant, high saturation magnetic flux density film according to claim 1 or 2, wherein the main constituent of said ferromagnetic metal is one selected from the group consisting of Fe, Co and Ni.

4. A heat resistant, high saturation magnetic flux density film according to claim 1, wherein said carbide is at least one kind selected from the group consisting of Hf—C, Nb—C, Ta—C, Ti—C, Zr—C, V—C, W—C, Mo—C, B—C and Si—C.

5. A heat resistant, high saturation magnetic flux density film according to claim 2, wherein said boride is at least one kind selected from the group consisting of Hf—B, Nb—B, Ta—B, Ti—B, Zr—B, V—B, Ba—B, Ca—B, Sr—B, La—B, Sm—B and Y—B.

6. A heat resistant, high saturation magnetic flux density film according to claim 1 or 2, wherein the grain size of each of the crystal grains is in a range between 50 Å and 500 Å, the thickness of said carbide or said boride being in a range between 1 Å and 100 Å, and the amount of said boride being in a range between 5 and 30 vol %.

7. A magnetic head comprising a magnetic core which has a heat resistant, high saturation magnetic flux density film as in any one of claims 1,2.

8. A magnetic head according to claim 7, wherein the main constituent of said ferromagnetic metal is Fe or Co or Ni.

9. A magnetic head according to claim 7, wherein said carbide is at least one kind selected from the group consisting of Hf—C, Nb—C, Ta—C, Ti—C, Zr—C, V—C, W—C, Mo—C, B—C and Si—C.

10. A magnetic head according to claim 7, wherein said boride is at least one kind selected from the group consisting of Hf—B, Nb—B, Ta—B, Ti—B, Zr—B, V—B, Ba—B, Ca—B, Sr—B, La—B, Sm—B and Y—B.

11. A magnetic head according to claim 7, wherein the size of each of the crystal grains is in a range between 50 Å and 500 Å, the thickness of said carbide or said boride being in a range between 1 Å and 100 Å, and the amount of said boride being in a range between 5 and 30 vol % of the crystal grains.

12. A heat resistant, high saturation magnetic flux density film according to claim 1, wherein said single layer is formed by simultaneously sputtering a carbide and at least one element selected from the group consisting of Fe, Co and Ni to form a sputtered layer, and subjecting the sputtered layer to heat treatment.

13. A heat resistant, high saturation magnetic flux density film according to claim 12, wherein said heat treatment is conducted at a temperature exceeding 500° C.

14. A heat resistant, high saturation magnetic flux density film according to claim 1, wherein said single layer is formed by simultaneously sputtering carbon, a metal element capable of reacting with carbon to form a carbide, and at least one element selected from the group consisting of Fe, Co and Ni to form a sputtered layer, and subjecting said sputtered layer to heat treatment.

15. A heat resistant, high saturation magnetic flux density according to claim 14, wherein said heat treatment is conducted at a temperature exceeding 500° C.

16. A heat resistant, high saturation magnetic flux density film according to claim 2, wherein said single layer is formed by simultaneously sputtering a boride and at least one element selected from the group consisting of Fe, Co and Ni to form a sputtered layer, and subjecting the sputtered layer to heat treatment.

17. A heat resistant, high saturation magnetic flux density film according to claim 16, wherein said heat treatment is conducted at a temperature exceeding 500° C.

18. A heat resistant, high saturation magnetic flux density film according to claim 2, wherein said single layer is formed by simultaneously sputtering boron, a metal element capable of reacting with boron to form a boride, and at least one element selected from the group consisting of Fe, Co and Ni to form a sputtered layer, and subjecting said sputtered layer to heat treatment.

19. A heat resistant, high saturation magnetic flux density according to claim 18, wherein said heat treatment is conducted at a temperature exceeding 500° C.

20. A magnetic head comprising a magnetic core which has a heat resistant, high saturation magnetic flux density film as in any one of claims 12, 14, 16 or 18.

* * * * *